US007530768B2

(12) United States Patent
Dürr et al.

(10) Patent No.: US 7,530,768 B2
(45) Date of Patent: May 12, 2009

(54) POWDER CONVEYING PUMP

(75) Inventors: Thomas Dürr, Tamm (DE); Hans-Georg Fritz, Ostfildern (DE); Frank Herre, Oberriexingen (DE)

(73) Assignee: Durr Systems, Inc., Auburn Hills, MI (US)

( * ) Notice: Subject to any disclaimer, the term of this patent is extended or adjusted under 35 U.S.C. 154(b) by 444 days.

(21) Appl. No.: 11/348,393

(22) Filed: Feb. 6, 2006

(65) Prior Publication Data

US 2006/0185586 A1 Aug. 24, 2006

Related U.S. Application Data

(60) Provisional application No. 60/653,718, filed on Feb. 17, 2005.

(51) Int. Cl.
*B65G 53/24* (2006.01)

(52) U.S. Cl. ........................................ 406/151; 406/98

(58) Field of Classification Search .................. 406/50, 406/85, 89–91, 98, 145, 151, 194, 195
See application file for complete search history.

(56) References Cited

U.S. PATENT DOCUMENTS 6,478,513 B1 * 11/2002 Higuchi et al. ................ 406/19
6,508,610 B2 * 1/2003 Dietrich ....................... 406/13
6,623,215 B2 * 9/2003 Dietrich ...................... 406/197
7,150,585 B2 * 12/2006 Kleineidam et al. ........... 406/50
7,287,964 B2 * 10/2007 Sanwald ..................... 417/397
2006/0093442 A1 * 5/2006 Kleineidam et al. ........... 406/10
2006/0193704 A1 * 8/2006 Simontacchi ................ 406/88
2007/0081865 A1 * 4/2007 Kleineidam et al. ........... 406/50

FOREIGN PATENT DOCUMENTS

WO WO2004087331 A1 * 10/2004

* cited by examiner

*Primary Examiner*—Gene Crawford
*Assistant Examiner*—William R Harp
(74) *Attorney, Agent, or Firm*—Rader Fishman & Grauer

(57) ABSTRACT

A powder transfer pump to convey a powder, in particular in a powder coating station. The powder transfer pump comprises a transfer chamber with a transfer chamber wall, an inlet opening into the transfer chamber to supply the powder to the transfer chamber, an outlet opening out of the transfer chamber to convey the powder from the transfer chamber, a negative pressure connection opening into the transfer chamber to generate negative pressure in the transfer chamber in order to suck the powder into the transfer chamber, and a positive pressure connection opening into the transfer chamber to discharge the powder that is present in the transfer chamber through the outlet. The transfer chamber wall is essentially gas-tight.

33 Claims, 6 Drawing Sheets

POWDER CONVEYING PUMP

CROSS-REFERENCE TO RELATED APPLICATIONS

This application claims priority to U.S. Provisional Patent Application Ser. No. 60/653,718 filed on Feb. 17, 2005, the entire contents of which is incorporated herein in its entirety.

FIELD OF THE INVENTION

The invention relates to a powder transfer pump for use in a powder coating installation.

DESCRIPTION OF THE RELATED ART

In powder coating installations, what is known as the dilute phase process was used previously to transport the powder serving as the coating material. In this process, the powder in fluidized form was transported in a stream of air through hose-shaped transfer lines to the application equipment (e.g., a spray gun or rotary atomizer). The term dilute phase process comes from the fact that the amount of powder in the powder-air mixture being transported is relatively small so that the hose-shaped transfer lines had to have a correspondingly large section in order to transport the desired quantity of powder.

For this reason the dense phase transfer system (PDF) was proposed, which system has a greater quantity of powder in the powder-air mixture being transported. The actual transfer of the powder can be carried out by means of a powder transfer pump, called a PDF pump, which has a transfer chamber with an inlet and an outlet wherein powder is sucked into the transfer chamber through the inlet and then discharged through the outlet to reach the application equipment (e.g., a spray gun or rotary atomizer). In order to fill the transfer chamber, the outlet from the transfer chamber is first closed, while the inlet to the transfer chamber is opened to suck powder out of a powder hopper. Then, negative pressure is generated in the transfer chamber by suctioning air through the walls of the transfer chamber. The walls are permeable to air but impermeable to powder so that the powder in the transfer chamber is not sucked out. When the transfer chamber is adequately filled, suctioning of the air is stopped, and the inlet valve is closed. To discharge the powder present in the transfer chamber, the outlet is opened and compressed air is blown into the chamber through the air-permeable walls of the chamber, thereby discharging the powder from the transfer chamber. Through cyclic operation of the previously described suction and discharge phases, powder is transported from the powder hopper to the application equipment. The transfer chamber can consist of a section of hose or pipe whose hollow cylindrical wall is permeable to gas but impermeable to powder and thus forms a filter element, where the inlet to the transfer chamber can be closed by an inlet valve while the outlet from the chamber can be sealed by an outlet valve.

SUMMARY OF THE INVENTION

A disadvantage of the known PDF pump just described is the fact that the transfer chamber walls consist of a porous material that can gradually clog with powder during operation, which clogging reduces the permeability to air of the chamber wall and thus reduces the quantity of powder transferred.

The invention thus prevents clogging of the air-permeable transfer chamber wall in the previously described known PDF pump. More specifically, the invention comprises constructing the transfer chamber wall to be essentially gas- or air-tight, diverging from the design principle of the known PDF pump described at the outset. Thus, the evacuation of air from the transfer chamber to generate negative pressure is accomplished by other means than the conventional way. In this way, the powder is prevented from caking on the transfer chamber wall. This is particularly advantageous because the powder inside the transfer chamber flows principally along the transfer chamber wall and can cake there particularly easily.

The generation of negative pressure in the transfer chamber with the powder transfer pump in accordance with the invention is preferably carried out by having the vacuum connection in the interior of the transfer chamber open at a distance from the wall. This is advantageous since powder density is particularly high close to the wall while powder density in the middle of the transfer chamber is considerably less so that the risk of becoming clogged with the powder is considerably less if suctioning of air takes place at a distance from the transfer chamber wall.

In a preferred embodiment, a diaphragm is located in the transfer chamber, The diaphragm is at least partially permeable to gas but impermeable to powder, with the vacuum connection for suctioning from the transfer chamber opening in the diaphragm. Suctioning from the transfer chamber does not take place directly out of the transfer chamber but by way of the diaphragm that, in like manner to the porous wall of the known PDF pump, forms a filter element.

The diaphragm is preferably located spaced away from the transfer chamber wall and may be located, for example, centrally inside the transfer chamber. This is expedient since the powder density inside the transfer chamber is considerably less in the center than in the area of the transfer chamber wall so that the risk of the diaphragm becoming clogged with powder is correspondingly less.

In addition, the diaphragm is preferably aerodynamically-shaped and is aligned between the inlet and the outlet of the transfer chamber in the direction of airflow, when the inlet and the outlet of the transfer chamber preferably lie opposite each other.

In a variation of the invention, the diaphragm is permeable to gas but impermeable to powder at least over a large part of its surface, resulting in less resistance to flow through the diaphragm body during evacuation.

By contrast, in another variation of the invention the diaphragm is essentially impermeable to gas and powder on the side facing the inlet and permeable to gas, but impermeable to powder, on the side facing the outlet of the transfer chamber. The gas and powder impermeability of the diaphragm body on the side facing the inlet advantageously makes it more difficult for the powder to cake on the diaphragm. The risk of powder caking on the side of the diaphragm facing the outlet is substantially less due to the air flow, so that the diaphragm can be configured to be gas-permeable on this side in order to evacuate air from the transfer chamber.

Emptying of the transfer chamber after it has previously been filled is carried out as with the known PDF pump described initially by discharging the powder in the transfer chamber by compressed air. The powder transfer pump in accordance with the invention preferably has a positive pressure connection that opens in the diaphragm body inside the chamber. The provision of compressed air to discharge the powder from the chamber is managed indirectly through the diaphragm body, which acts as a filter element.

In this it is possible that the negative pressure connection for evacuating the transfer chamber and the positive pressure connection to discharge the powder from the transfer chamber open into the diaphragm through a common line. This is advantageous since a separate line for the negative pressure connection, or the positive pressure connection, can be eliminated.

However, it is alternatively possible for the positive pressure connection for discharging the powder from the chamber to open directly into the transfer chamber, that is to say, outside the body of the diaphragm. This is advantageous because the build-up of pressure in the chamber when the powder is discharged from the chamber is not hampered by the airflow resistance of the diaphragm body, which results in faster emptying of the transfer chamber.

The invention further contemplates building up the negative pressure in the transfer chamber at least partially before the inlet to the chamber is opened. The inlet into the chamber is not opened until negative pressure has already built up in the chamber. This offers the advantage that fluctuations in the build-up of negative pressure in the transfer chamber have less effect on metering accuracy. The powder transfer pump in accordance with the invention therefore has an inlet valve and a suction valve that can be controlled independently of each other in order to be able to open the suction valve first so that negative pressure is built up in the transfer chamber before the inlet valve is opened.

It is even preferable for the generation of negative pressure in the transfer chamber to be completed before the inlet to the transfer chamber is opened. The phase of negative pressure generation and the evacuation phase preferably do not exhibit any overlap in timing. This offers the advantage that when air is being evacuated from the transfer chamber the closed inlet prevents any powder from being sucked out, which would be undesirable. For this reason, even a filter element for evacuating air from the transfer chamber can be eliminated with the result that higher negative pressure can be generated in the transfer chamber for a given level of equipment. However, within the scope of the invention, evacuation of the transfer chamber is preferably performed through a filter element to prevent the suctioning of powder residue that may be present in the transfer chamber.

The inlet to the transfer chamber is preferably not opened until a predetermined negative pressure has built up in the transfer chamber. This offers the advantage that specified pressure conditions are reached at the start of the induction phase so that the quantity of powder sucked in can easily be calculated and regulated. To this end, the negative pressure in the transfer chamber can be measured by a pressure sensor, at which time a control unit closes the suction valve and simultaneously, or with a timed delay, opens the inlet valve when the negative pressure measured in the transfer chamber has reached a predetermined limit.

Alternatively, it is also possible that a predetermined negative pressure is built up in the transfer chamber before the inlet valve is opened by opening the suction valve for a predetermined time period in accordance with the desired negative pressure, where the functional correspondence between the duration of the suction valve being open and the resulting negative pressure can be determined by testing.

Delivery of the powder present in the transfer chamber through the outlet preferably takes place by discharging the powder. For this, a positive pressure connection preferably opens into the transfer chamber through which a fluid can be introduced into the transfer chamber to discharge the powder, where the positive pressure connection can be closed by means of a discharge valve. The discharge valve can preferably be controlled independently of the inlet valve, the outlet valve and/or the suction valve. This offers the advantage that the negative pressure generation phase, the induction phase, the outlet phase and the discharge phase can be controlled independently of each other to achieve optimal transfer characteristics.

Cleaning of the transfer chamber can take place in addition within the scope of the invention by introducing a cleaning fluid (e.g., compressed air) into the transfer chamber. In contrast to the known PDF pump described at the outset, the cleaning fluid is preferably introduced through the diaphragm and not directly into the transfer chamber. This offers the advantage of a slower pressure build-up in the transfer chamber during the cleaning operation, which reduces the risk of the transfer hose bursting. However, within the scope of the invention the alternative possibility also exists that the cleaning fluid is introduced directly into the transfer chamber, by-passing the diaphragm.

The duration of a complete operating cycle, including negative pressure generation phase, induction phase and discharge phase, lies preferably in the range from 200 ms to 1 second, where any values in between are possible. A cycle time of 500 ms is particularly advantageous.

The negative pressure generation phase, the induction phase and the discharge phase can be of different lengths or the same length, where values between 50 ms and 200 ms or any values within this range are possible. A duration of 150 ms for the negative pressure generation phase, the induction phase and/or the discharge phase has proved to be advantageous. The invention is, however, not restricted to the aforementioned values for the duration of the negative pressure generation phase, the induction phase and the discharge phase but can be implemented with other values.

It should further be mentioned that timed delays preferably come between the negative pressure generation phase, the induction phase and the discharge phase. Such timed delays, for example, may lie in the range between 20 ms and 200 ms. These timed delays are intended to ensure that the individual valves have reached the desired valve position after they have been actuated. The invention is, however, not restricted to the values described with respect to the duration of the timed delays but can be implemented with other values for the timed delay.

Finally, it should be mentioned that the invention is not limited to a powder transfer pump as an individual component but rather includes a powder coating installation having such a powder transfer pump.

Other advantageous refinements of the invention are identified in the dependent claims or are explained in detail in what follows, together with the description of the preferred embodiment of the invention with reference to the figures.

BRIEF DESCRIPTION OF THE DRAWING

The description herein makes reference to the accompanying drawing wherein like reference numerals refer to like parts throughout the several views, and wherein.

DETAILED DESCRIPTION

Figure 1:
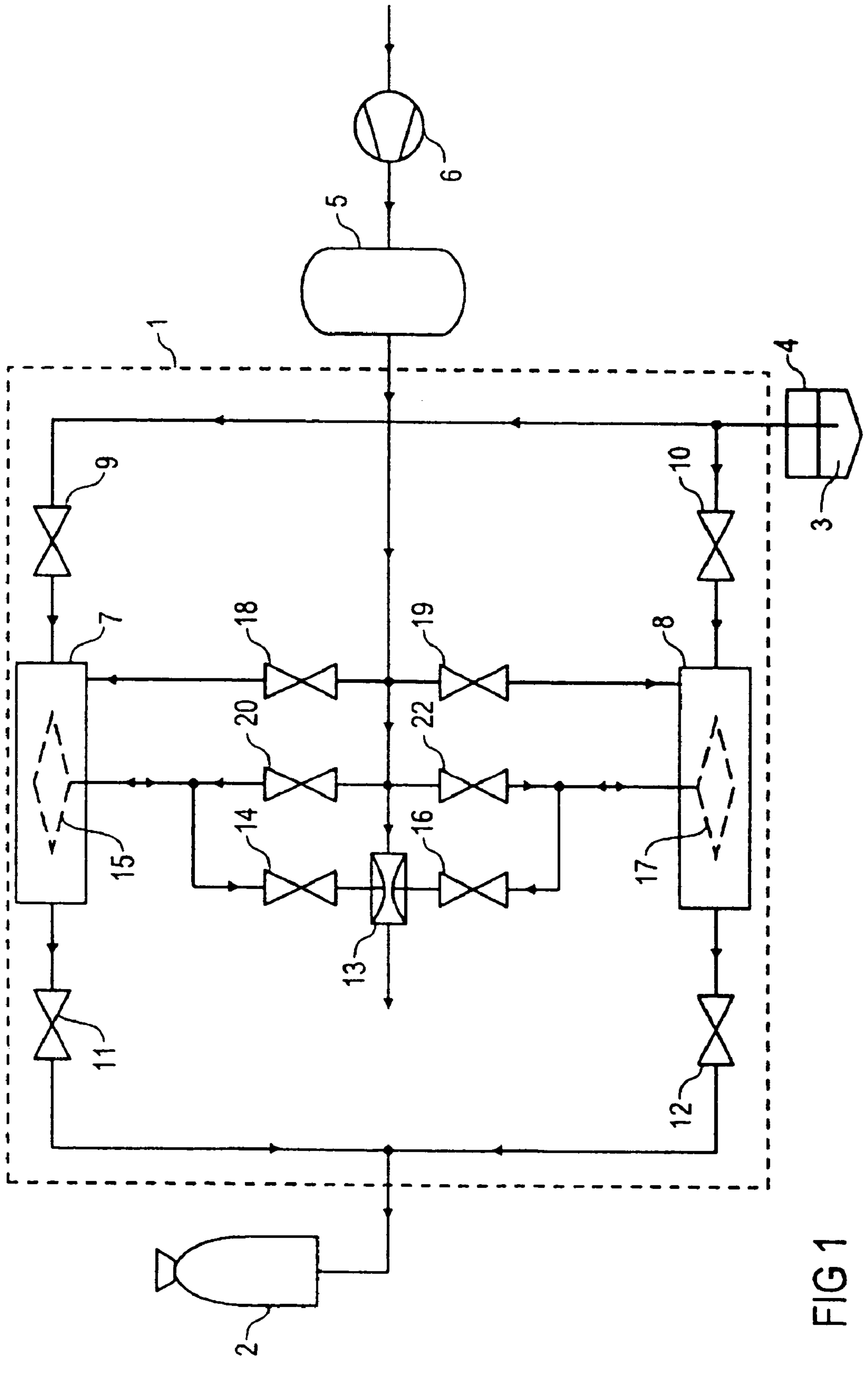
FIG. 1 shows a fluid flow chart of a preferred embodiment of a powder coating installation having a powder transfer pump in accordance with the invention.

The fluid flow chart in FIG. 1 shows a powder coating installation with a powder transfer pump 1 to supply powder to a rotary atomizer 2, where the rotary atomizer 2 may be of conventional construction and is therefore not described further in what follows. Another powder application device may be used in place of the rotary atomizer 2, for example, a spray gun.

To receive a powder 3 acting as the coating means, the powder transfer pump 1 is connected on the input side to a powder hopper 4, where the powder hopper 4 may similarly be of conventional construction and is therefore not described in detail in what follows.

The powder transfer pump 1 is furthermore connected on the input side to a compressed air tank 5, which is fed by an air compressor 6. To convey the powder, the powder transfer pump 1 has two branches running in parallel, each with a transfer chamber 7, 8.

The two transfer chambers 7, 8 each have an inlet. The two inlets of the transfer chambers 7, 8 are respectively connected to the powder hopper 4 by an inlet valve 9, 10. When the inlet valve 9, 10 is open, the powder 3 can be sucked into the transfer chambers 7, 8, respectively, out of the powder hopper 4, as will be described in detail hereinafter.

Furthermore, the transfer chambers 7, 8 each have an outlet. The two outlets of the transfer chambers 7, 8 are respectively connected to the rotary atomizer by an outlet valve 11, 12. When the outlet valve 11, 12 is open, the powder in the transfer chambers 7, 8, respectively, can be discharged from the transfer chambers 7, 8, as will also be described in detail hereinafter.

The inlet valves 9, 10 and the outlet valves 11, 12 can each be configured as squish valves, which may be powered pneumatically, hydraulically or electrically.

To suction the powder 3 through the inlet valves 9, 10 into the respective transfer chambers 7, 8, the powder transfer pump 1 has a negative pressure generator 13, which is of conventional construction. The negative pressure generator 13 has an injector nozzle supplied with compressed air from the compressed air tank 5. In accordance with the venturi principle, the compressed air generates negative pressure at a negative pressure connection.

The negative pressure connection on the negative pressure generator 13 is connected through a suction valve 14 to a diaphragm 15 located inside the transfer chamber 7 and through a suction valve 16 to a diaphragm 17 located inside the transfer chamber 8. The diaphragms 15, 17 are both permeable to gas but impermeable to powder so that air can be evacuated through the diaphragms 15, 17 from the transfer chambers 7, 8, respectively, whereas the powder 3 remains in the transfer chambers 7, 8. When suction valve 14 is opened, the negative pressure generator 13 evacuates air from the transfer chamber 7 through the diaphragm 15 and generates negative pressure there to suck powder 3 out of the powder hopper 4. In the same fashion, the negative pressure generator 13 generates negative pressure in the transfer chamber 8 when suction valve 16 is opened.

The compressed air tank 5 is not only connected to the negative pressure generator 13 to generate negative pressure in the transfer chambers 7, 8, but also serves to discharge the powder 3 from the transfer chambers 7, 8. For this purpose, the compressed air tank 5 is connected to transfer chamber 7 through a discharge valve 18 and to transfer chamber 8 through a further discharge valve 19. With the discharge valves 18, 19 in the opened state, compressed air is blown out of the compressed air tank 5 into the transfer chambers 7, 8, respectively, whereby the powder 3 present in the transfer chambers 7, 8 is discharged as long as the outlet valves 11, 12 are open. It is important in this that the discharge valves 18, 19 open directly into the transfer chambers, bypassing the diaphragms 15, 17. This offers the advantage that the pressure build-up in the transfer chambers 7, 8 is not slowed by the airflow resistance of the diaphragms 15, 17 when the powder 3 is discharged from the transfer chambers 7, 8. The direct supply of compressed air into the transfer chambers 7, 8 advantageously permits a faster build-up of pressure and thereby rapid emptying of the transfer chambers 7, 8.

Compressed air stored in the compressed air tank 5 serves not only to discharge the powder 3 in the transfer chambers 7, 8, but also to purge the transfer chambers 7, 8. For this purpose, the compressed air tank 5 is connected through a purge valve 20 to transfer chamber 7 and in like manner through a purge valve 22 to transfer chamber 8. The compressed air tank 5 blows compressed air into transfer chamber 7 for purging purposes when purge valve 20 is opened. Similarly, compressed air is blown into transfer chamber 8 for purging purposes when purge valve 22 is open.

The supply of purge air through the diaphragms 15, 17 offers the advantage that the build-up of pressure takes place more slowly in the purge mode, which reduces the risk of a transfer hose bursting in the purge mode.

Figure 2:
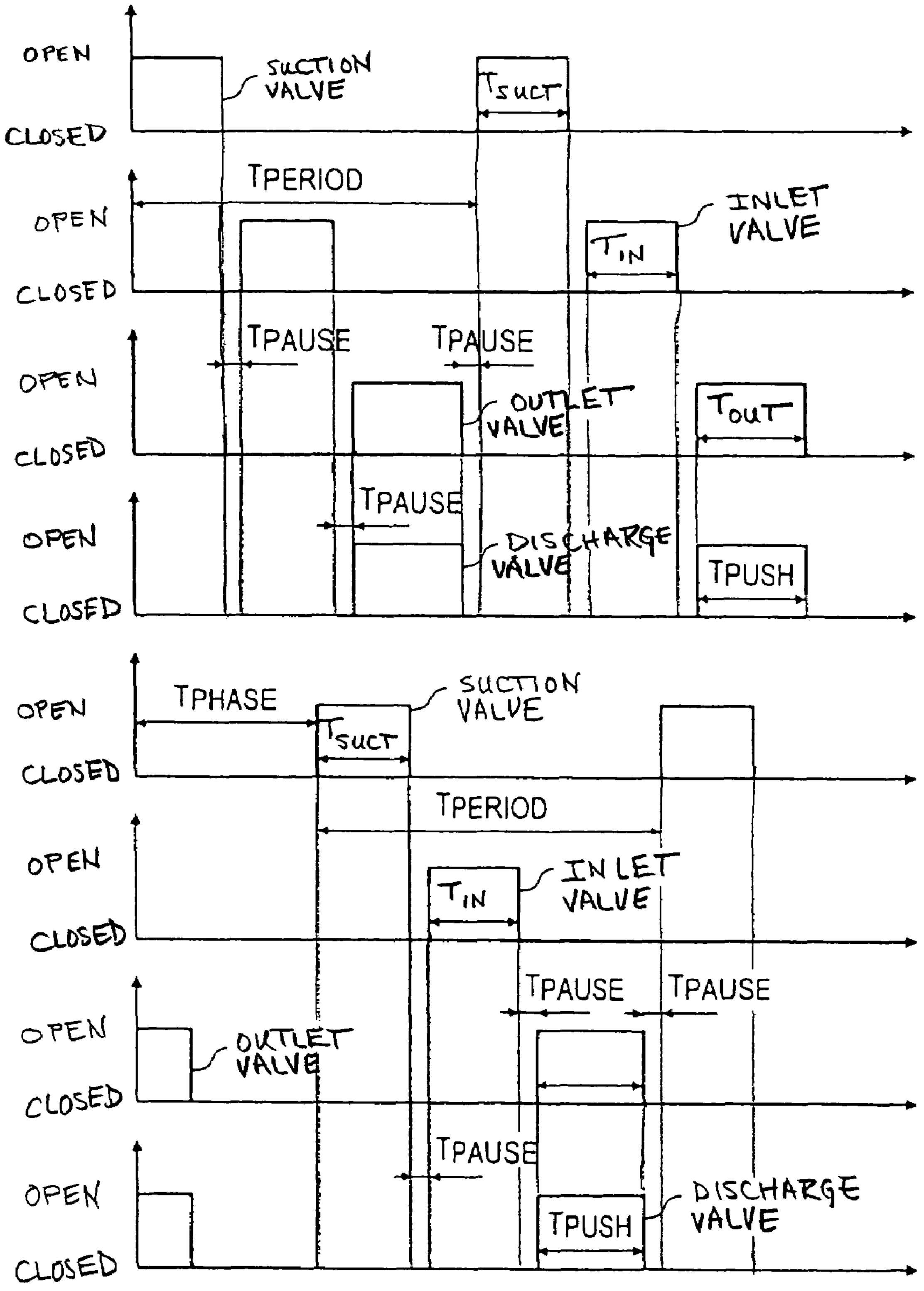
FIG. 2 shows several timing diagrams to clarify the opening and closing characteristics of the individual valves of the powder transfer pump in accordance with the invention from FIG. 1.

In what follows, the operating method of the powder transfer pump 1 will be explained with reference to FIG. 2. The four upper timing diagrams in FIG. 2 show from top to bottom the chronological opening characteristics of the suction valve 14, the inlet valve 9, the outlet valve 11 and the discharge valve 18. The four lower timing diagrams in FIG. 2, on the other hand, show from top to bottom the chronological opening characteristics of the suction valve 16, the inlet valve 10, the outlet valve 12 and the discharge valve 19.

At the start of a working cycle, the suction valve 14 is opened first, while the inlet valve 9, the outlet valve 11 and the discharge valve 18 are closed. The suction valve 14 is open for a period $T_{SUCT}$, which can be in the range between 10 ms and 200 ms. During this phase of negative pressure generation, a specified negative pressure is generated in the transfer chamber 7. This negative pressure is later used to suck the powder 3 into the transfer chamber 7, as will be described in detail hereinafter.

When the negative pressure generation phase is concluded, the suction valve 14 is closed, with the inlet valve 9, the outlet valve 11 and the discharge valve 18 remaining closed during a predetermined timed delay $T_{PAUSE}$. The timed delay $T_{PAUSE}$ is in the range between 10 ms and 200 ms and ensures that no overlap occurs in the individual phases of a working cycle.

When the timed delay $T_{PAUSE}$ has expired, the inlet valve 9 is opened so that the negative pressure previously built up in the transfer chamber 7 sucks the powder 3 out of the powder hopper 4. This fills the transfer chamber 7 with powder. The inlet valve 9 is opened for a period $T_{IN}$, which can be in the range between 50 ms and 200 ms. When this inlet phase is complete, the inlet valve 9 is closed. The outlet valve 11, the discharge valve 18 and the suction valve 14 remain closed initially during a further timed delay.

When this timed delay has expired, the outlet valve 11 and the discharge valve 18 are opened simultaneously so that compressed air is blown out of the compressed air tank 5 into the transfer chamber 7, whereby the powder 3 present in the transfer chamber 7 is discharged through the outlet valve 11. The open phase of the outlet valve 11 can have a duration of $T_{OUT}$, which can be in the range between 50 to 200 ms. The open phase of the discharge valve 18 can also have a duration $T_{PUSH}$, which is in the range of 50 ms to 200 ms.

After the outlet and discharge phase is complete, the outlet valve 11 and the discharge valve 18 are closed. The inlet valve 9 and the suction valve 14 similarly remaining closed for a timed delay. After completion of this timed delay, the previously described working cycle is repeated, where one cycle has a duration time $T_{PERIOD}$, which can be, for example, 500 ms.

The inlet valve 10, the outlet valve 12, the discharge valve 19 and suction valve 16 are actuated in the same way, although a phase shift $T_{PHASE}$ is provided, which length can be in the area of 250 ms.

An advantage of the lack of overlap in the negative pressure phase and the induction phase is that at the start of the induction phase a specified negative pressure has already been created in transfer chamber 7 or 8 so that the transfer volume can be precisely predefined.

The direct connection of the discharge valves 18, 19 to the transfer chambers 7, 8, which bypasses the respective diaphragms 15, 17, offers the advantage that the build-up of pressure is not hampered by the diaphragms 15, 17, allowing more rapid emptying of the transfer chambers 7, 8.

Figure 3:
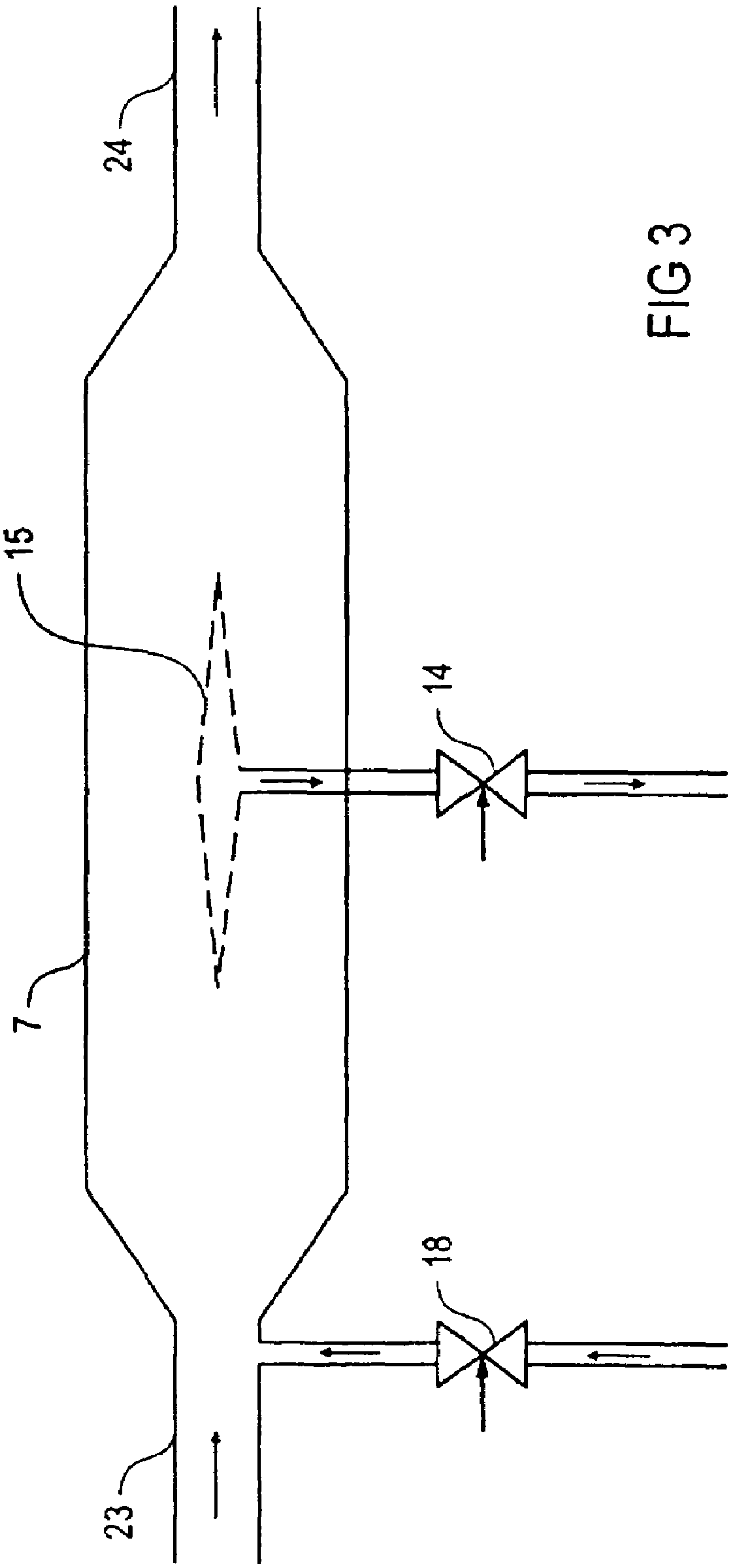
FIGS. 3-6 show various embodiments of the transfer chambers of the powder transfer pumps from FIG. 1.

The detailed view in FIG. 3 shows transfer chamber 7, with the other transfer chamber 8 being similarly constructed and therefore not described further.

In order to supply the powder 3, the transfer chamber 7 has an inlet 23, with the inlet 23 being connected to the inlet valve 9 shown in FIG. 1. Furthermore, the transfer chamber 7 has an outlet 24, which is connected to the outlet valve 11 shown in FIG. 1.

The diaphragm 15 is aerodynamically-shaped and is preferably located centrally inside the transfer chamber 7. This location is advantageous because the powder density during operation is considerably greater close to the wall inside the transfer chamber 7 than in the center, so that the risk of the diaphragm 15 becoming clogged by the powder 3 is least in the center of the transfer chamber 7. In addition, the diaphragm 15 is aligned in the transfer chamber 7 parallel to the direction of air flow between the inlet 23 and the outlet 24 so that the diaphragm 15 only minimally hampers the airflow inside the transfer chamber 7.

Figure 4:
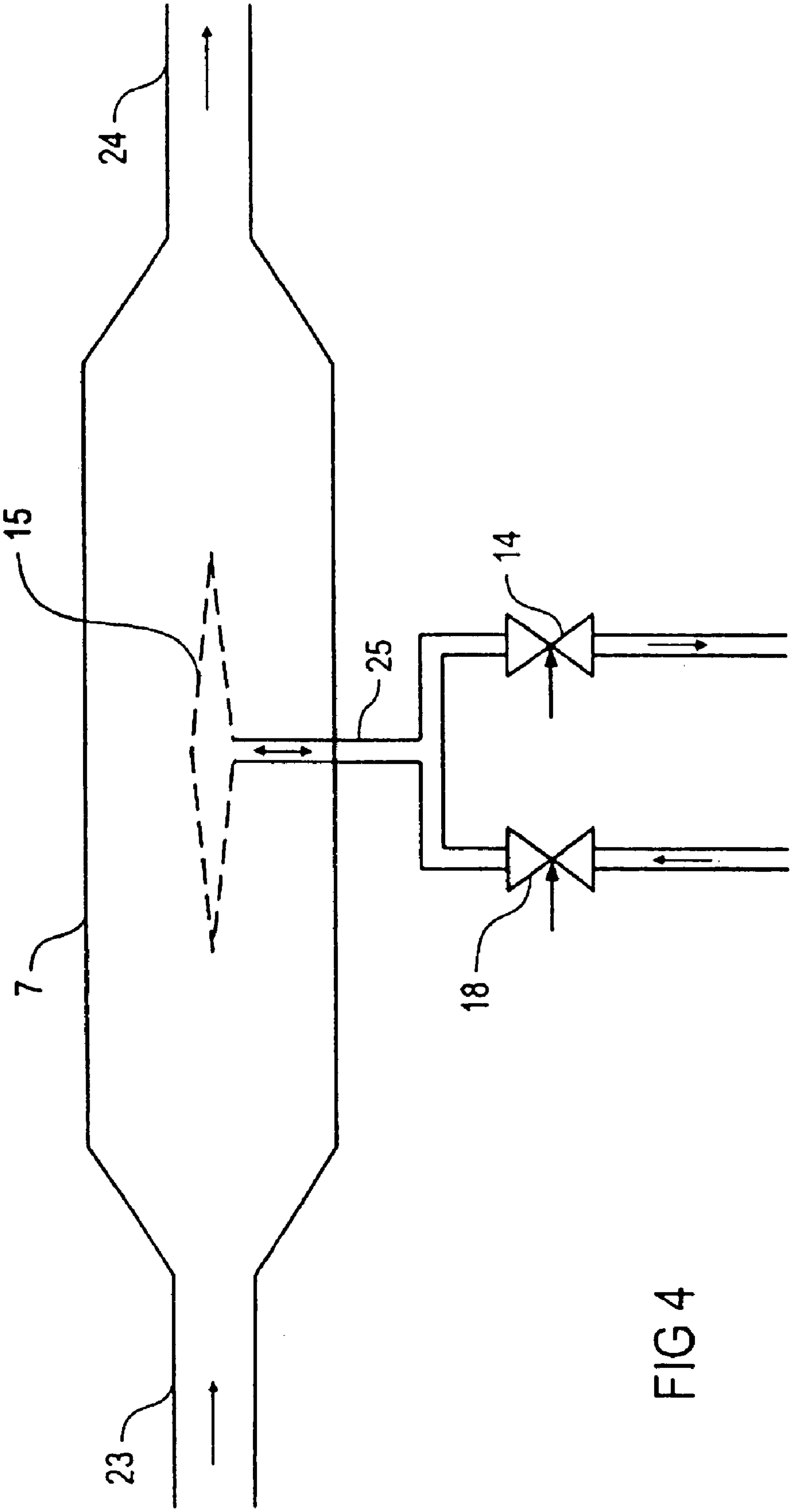

FIG. 4 shows an alternative embodiment of the transfer chamber 7, which corresponds in large part to the embodiment described previously and shown in FIG. 3 so that broad reference is made to the preceding description to avoid repetition.

A special feature of this embodiment is that both the supply of compressed air to discharge the powder 3 from the transfer chamber 7 and evacuation of the transfer chamber 7 to generate negative pressure take place through the diaphragm 15. The discharge valve 18 and the suction valve 14 are connected through a common line 25 to the diaphragm 15. This offers the advantage that there is no need for an additional line inside the transfer chamber 7.

Figure 5:
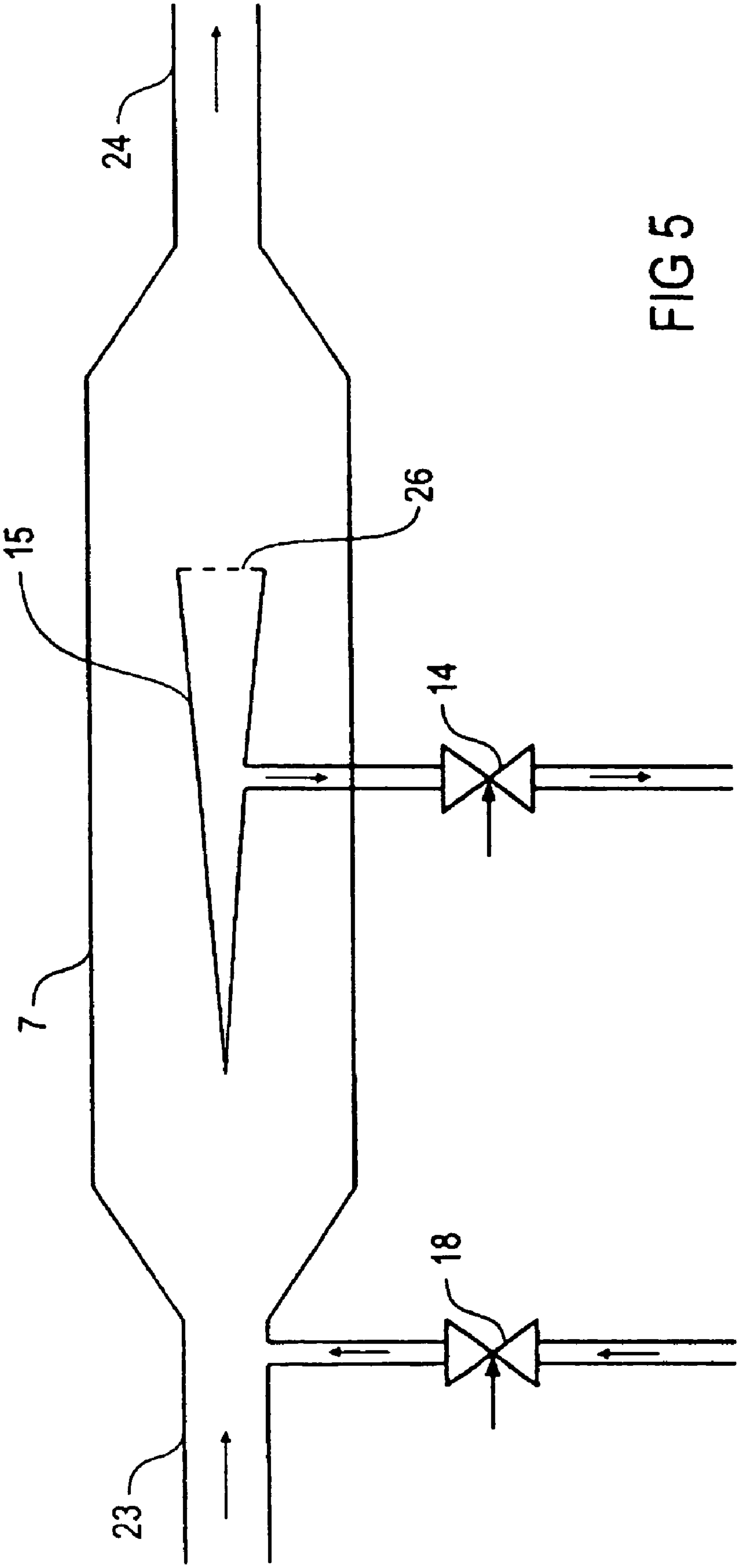

The embodiment of the transfer chamber 7 shown in FIG. 5 similarly corresponds in large measure to the embodiment previously described and shown in FIG. 3 so that broad reference is made to the preceding description to avoid repetition.

One special feature of this embodiment is that the diaphragm 15 is both gas-impermeable and powder-impermeable on the side facing the inlet 23. In this way, the powder 3 is prevented from becoming caked in the diaphragm 15 as the result of the airflow inside the transfer chamber 7. On the side facing the outlet 24 the diaphragm 15 has a gas-permeable but powder-impermeable porous wall 26 through which air is evacuated from the transfer chamber 7 during the negative pressure generation phase. Clogging of the wall 26 by the powder 3 is largely eliminated as the result of airflow.

Figure 6:
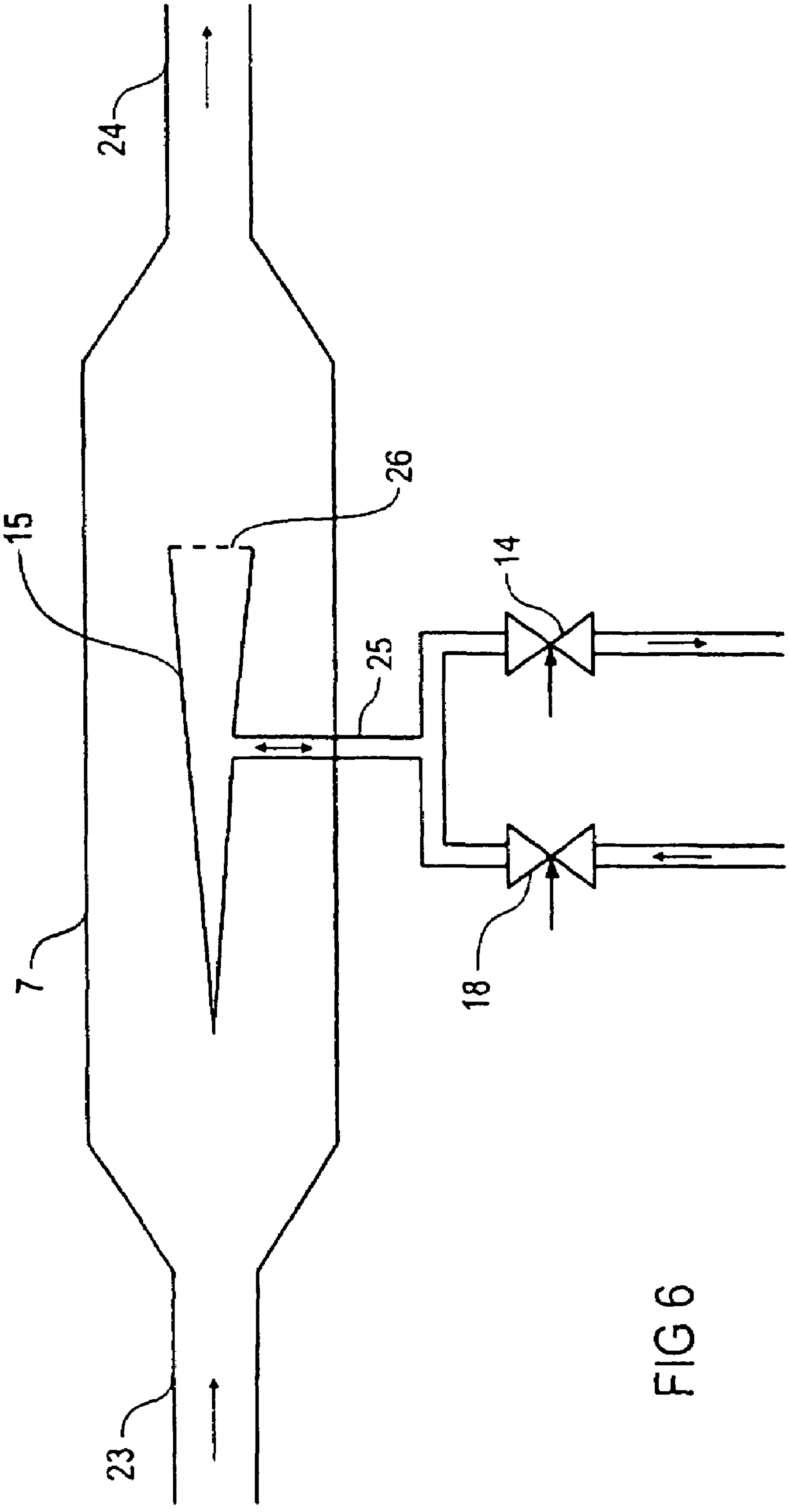

Finally, the embodiment in accordance with FIG. 6 combines the shape of the diaphragm 15 in accordance with FIG. 5 with the common line 25 in accordance with FIG. 4.

The invention is not limited to the preferred embodiments previously described. Rather, a plurality of variants and modifications are possible that make similar use of the inventive ideas and therefore fall within its spirit and scope.

What is claimed is:

1. A powder transfer pump to convey a powder in a powder coating station, the power transfer pump comprising:

a transfer chamber with a transfer chamber wall, the transfer chamber wall being essentially gas-tight;

an inlet opening into the transfer chamber to supply the powder to the transfer chamber;

an outlet opening out of the transfer chamber to convey the powder from the transfer chamber;

a negative pressure connection opening into the transfer chamber to generate negative pressure in the transfer chamber; and a positive pressure connection opening into the transfer chamber to blow the powder in the transfer chamber out through the outlet, wherein the negative pressure connection opens in the interior of the transfer chamber spaced apart from the transfer chamber wall.

2. The powder transfer pump according to claim 1, further comprising:

a diaphragm located in the transfer chamber, the diaphragm at least partially permeable to gas but impermeable to powder; and wherein the negative pressure connection opens inside the transfer chamber in the diaphragm.

3. The powder transfer pump according to claim 2 wherein the diaphragm is spaced apart from the transfer chamber wall.

4. The powder transfer pump according to claim 2 wherein the diaphragm is centrally located in the transfer chamber.

5. The powder transfer pump according to claim 4 wherein the diaphragm has an aerodynamic shape.

6. The powder transfer pump according to claim 2 wherein the diaphragm is permeable to gas over a majority of its surface.

7. The powder transfer pump according to claim 2 wherein the diaphragm is impermeable to gas and powder on the side facing the inlet and permeable to gas but impermeable to powder on the side facing the outlet.

8. The powder transfer pump according to claim 2 wherein the positive pressure connection opens inside the transfer chamber in the diaphragm.

9. The powder transfer pump according to claim 8, further comprising:

a common line extending into the diaphragm wherein the negative pressure connection and the positive pressure connection open into the diaphragm through the common line.

10. The powder transfer pump according to claim 1, further comprising:

a diaphragm located in the transfer chamber and spaced apart from the chamber wall, the diaphragm at least partially permeable to gas but impermeable to powder; and wherein the positive pressure connection opens into the transfer chamber outside the diaphragm.

11. The powder transfer pump according to claim 10 wherein the inlet and the outlet open into the transfer chamber on opposite sides of the chamber wall.

12. The powder transfer pump according to claim 11 wherein the diaphragm has an aerodynamic shape.

13. The powder transfer pump according to claim 11 wherein the diaphragm is impermeable to gas and powder on the side facing the inlet and permeable to gas but impermeable to powder on the side facing the outlet.

14. The powder transfer pump according to claim 10 wherein the diaphragm has an aerodynamic shape.

15. The powder transfer pump according to claim 1 wherein the inlet and the outlet open into the iransfer chamber on opposite sides of the chamber wall.

16. The powder transfer pump according to claim 15, further comprising:

a diaphragm centrally located in the transfer chamber between the inlet and the output, the diaphragm at least partially permeable to gas but impermeable to powder; and wherein the negative pressure connection opens inside the transfer chamber in the diaphragm.

17. The powder transfer pump according to claim 16 wherein the diaphragm has an aerodynamic shape.

18. The powder transfer pump according to claim 16 wherein the diaphragm is impermeable to gas and powder on the side facing the inlet and permeable to gas but impermeable to powder on the side facing the outlet.

19. A powder transfer pump to convey a powder in a powder coating station, the power transfer pump comprising:

a transfer chamber with a transfer chamber wall, the transfer chamber wall being essentially gas-tight;

an inlet opening into the transfer chamber to supply the powder to the transfer chamber;

an outlet opening out of the transfer chamber to convey the powder from the transfer chamber;

a negative pressure connection opening into the transfer chamber to generate negative pressure in the transfer chamber;

a positive pressure connection opening into the transfer chamber to blow the powder in the transfer chamber out through the outlet; and a diaphragm located in the transfer chamber, the diaphragm at least partially permeable to gas but impermeable to powder; and wherein the negative pressure connection opens inside the transfer chamber in the diaphragm.

20. The powder transfer pump according to claim 19, wherein the diaphragm is spaced apart from the transfer chamber wall.

21. The powder transfer pump according to claim 19, wherein the diaphragm is centrally located in the transfer chamber.

22. The powder transfer pump according to claim 21, wherein the diaphragm has an aerodynamic shape.

23. The powder transfer pump according to claim 19, wherein the diaphragm is permeable to gas over a majority of its surface.

24. The powder transfer pump according to claim 19, wherein the diaphragm is impermeable to gas and powder on the side facing the inlet and permeable to gas but impermeable to powder on the side facing the outlet.

25. The powder transfer pump according to claim 19, wherein the positive pressure connection opens inside the transfer chamber in the diaphragm.

26. The powder transfer pump according to claim 25, further comprising a common line extending into the diaphragm wherein the negative pressure connection and the positive pressure connection open into the diaphragm through the common line.

27. A powder transfer pump to convey a powder in a powder coating station, the power transfer pump comprising:

a transfer chamber with a transfer chamber wall, the transfer chamber wall being essentially gas-tight;

an inlet opening into the transfer chamber to supply the powder to the transfer chamber;

an outlet opening out of the transfer chamber to convey the powder from the transfer chamber;

a negative pressure connection opening into the transfer chamber to generate negative pressure in the transfer chamber;

a positive pressure connection opening into the transfer chamber to blow the powder in the transfer chamber out through the outlet; and a diaphragm located in the transfer chamber and spaced apart from the chamber wall, the diaphragm at least partially permeable to gas but impermeable to powder; and wherein the positive pressure connection opens into the transfer chamber outside the diaphragm, wherein the diaphragm is impermeable to gas and powder on the side facing the inlet and permeable to gas but impermeable to powder on the side facing the outlet.

28. The powder transfer pump according to claim 27, wherein the inlet and the outlet open into the transfer chamber on opposite sides of the chamber wall.

29. The powder transfer pump according to claim 28, wherein the diaphragm has an aerodynamic shape.

30. The powder transfer pump according to claim 27, wherein the diaphragm has an aerodynamic shape.

31. A powder transfer pump to convey a powder in a powder coating station, the power transfer pump comprising:

a transfer chamber with a transfer chamber wall, the transfer chamber wall being essentially gas-tight;

an inlet opening into the transfer chamber to supply the powder to the transfer chamber;

an outlet opening out of the transfer chamber to convey the powder from the transfer chamber, wherein the inlet and the outlet open into the transfer chamber on opposite sides of the chamber wall;

a negative pressure connection opening into the transfer chamber to generate negative pressure in the transfer chamber;

a positive pressure connection opening into the transfer chamber to blow the powder in the transfer chamber out through the outlet; and a diaphragm centrally located in the transfer chamber between the inlet and the output, the diaphragm at least partially permeable to gas but impermeable to powder; and wherein the negative pressure connection opens inside the transfer chamber in the diaphragm.

32. The powder transfer pump according to claim 31, wherein the diaphragm has an aerodynamic shape.

33. The powder transfer pump according to claim 31, wherein the diaphragm is impermeable to gas and powder on the side facing the inlet and permeable to gas but impermeable to powder on the side facing the outlet.

* * * * *